United States Patent [19]

Schaeffer

[11] 3,856,903

[45] Dec. 24, 1974

[54] METHOD OF MOLDING EXPANDABLE POLYSTYRENE

[75] Inventor: Paul R. Schaeffer, Paoli, Pa.

[73] Assignee: The Alan I. W. Frank Corporation, Pittsburgh, Pa.

[22] Filed: Jan. 31, 1973

[21] Appl. No.: 328,172

[52] U.S. Cl.................. 264/51, 260/2.5 B, 264/53, 264/DIG. 9
[51] Int. Cl............................................ B29d 27/00
[58] Field of Search.................. 264/51, 53, DIG. 9; 260/33.6 UA, 235, 2.5 B

[56] References Cited
UNITED STATES PATENTS

| | | | |
|---|---|---|---|
| 2,357,833 | 9/1944 | Kropscott et al. | 260/235 |
| 3,086,885 | 4/1963 | Jahn | 264/DIG. 9 |
| 3,235,529 | 2/1966 | Nagle | 260/33.6 UA |
| 3,300,437 | 1/1967 | Ferrigno | 260/2.5 B X |
| 3,359,220 | 12/1967 | Wright | 260/2.5 B |
| 3,494,862 | 2/1970 | Horowitz | 260/2.5 B X |
| 3,661,810 | 5/1972 | Gahmig | 260/2.5 B |

OTHER PUBLICATIONS

The Condensed Chemical Dictionary, Seventh Edition, Completely revised and enlarged by Arthur and Elizabeth Rose, New York, Reinhold, 1966, pages 632, 723, 724.
Modern Plastics Encyclopedia, 1970–1971, Vol. 47, No. 10A, October 1970, page 859.
Sears; Francis Weston, and Mark W. Zemonsky, College Physics, Third Edition, Reading, Mass., Addison–Wesley, c1960, pp. 308–310.
Lange; Norbert Adolph and Gordon M. Forker, Handbook of Chemistry, revised tenth edition, New York, McGraw–Hill, c1967, pp. 1544.
Hackh's Chemical Dictionary, fourth edition, completely revised and edited by Julius Grant, New York, McGraw–Hill, c1969, page 431.
Modern Plastics Encyclopedia, 1970–1971, Vol. 47, No. 10A, October 1970, pp. 782–784.

*Primary Examiner*—Philip E. Anderson
*Attorney, Agent, or Firm*—Edward Hoopes, III

[57] ABSTRACT

A method of molding expandable polystyrene comprising admixing expandable polystyrene beads with mineral oil, expanding the polystyrene beads admixed with mineral oil, introducing the expanded polystyrene into a mold and applying heat to fuse the expanded polystyrene into an article having the shape of the mold, the mineral oil having the effect of reducing the time of application of heat required for adequate fusion of the expanded polystyrene into the article having the shape of the mold. 1 to 6 grams, preferably 2½ grams, of mineral oil are admixed with 10 pounds of polystyrene beads. The polystyrene beads admixed with mineral oil are preferably expanded to a density of about 3.6 pounds per cubic foot and air dried and screened to yield beads in the range of .02 inch – .07 inch in diameter which are molded into the article having the shape of the mold.

3 Claims, No Drawings

METHOD OF MOLDING EXPANDABLE POLYSTYRENE

This invention relates to a method of molding expandable polystyrene in which the amount of heat required for molding the polystyrene is materially reduced which in turn results in reduction of the heating time and consequent increase in molding efficiency and decrease in molding cost. I achieve the result by admixing expandable polystyrene beads with mineral oil, expanding the polystyrene beads admixed with mineral oil, introducing the expanded polystyrene into a mold and applying heat to fuse the expanded polystyrene into an article having the shape of the mold. The mineral oil has the effect of reducing the time of application of heat required for adequate fusion of the expanded polystyrene into the article having the shape of the mold. I admix 1 to 6 grams, preferably 2½ grams, of mineral oil with 10 pounds of polystyrene beads. I preferably expand the polystyrene beads admixed with mineral oil to a density of about 3.6 pounds per cubic foot and screen the expanded polystyrene to yield beads in the range .02 inch – .07 inch in diameter which are molded into the article having the shape of the mold.

As an example of the practice of my invention, 100 grams of mineral oil was dispersed on the surface of 400 pounds of polystyrene beads Fostarene T-50 containing trichloromonofluoromethane and dichlorodifluoromethane as blowing agents. After adequate mixing the polystyrene was expanded in a Rodman type pre-expander to a density of 3.6 pounds per cubic foot. The material was air dried and passed through screens to remove large and small beads yielding a molding material in the range of .02 inch – .07 inch in diameter. After approximately one hour of storage the material was molded into drinking cups in a conventional molding machine. The molding required only two seconds of heating time.

The same procedure as above described was repeated but omitting the admixture of the polystyrene beads with mineral oil. The heating time required for molding was eight seconds as compared with the two seconds heating time with the polystyrene beads treated with mineral oil.

While I have described a present preferred method of practicing the invention, it is to be distinctly understood that the invention is not limited to the described method but may be otherwise practiced within the scope of the following claims.

I claim:

1. A method of molding expandable polystyrene comprising admixing expandable polystyrene beads with mineral oil in the proportions of 1 to 6 grams of mineral oil to 10 pounds of expandable polystyrene beads, expanding the polystyrene beads admixed with mineral oil, introducing the expanded polystyrene into a mold and applying heat to fuse the expanded polystyrene into an article having the shape of the mold, the mineral oil having the effect of reducing the time of application of heat required for adequate fusion of the expanded polystyrene into the article having the shape of the mold.

2. A method as claimed in claim 1 in which the expandable polystyrene beads admixed with mineral oil are expanded to a density of about 3.6 pounds per cubic foot and screened to yield beads in the range .02 inch – .07 inch in diameter which are molded into the article having the shape of the mold.

3. A method as claimed in claim 2 in which 2½ grams of mineral oil are admixed with 10 pounds of expandable polystyrene beads and the expandable polystyrene beads admixed with mineral oil are expanded to a density of about 3.6 pounds per cubic foot and air dried and screened to yield beads in the range .02 inch – .07 inch in diameter which are molded into the article having the shape of the mold.

* * * * *